(12) United States Patent
Corkran et al.

(10) Patent No.: US 7,651,641 B2
(45) Date of Patent: *Jan. 26, 2010

(54) VEGETABLE OIL BASED DIELECTRIC FLUID AND METHODS OF USING SAME

(75) Inventors: Jerry L. Corkran, Waukesha, WI (US); C. Patrick McShane, Waukesha, WI (US); Kevin J. Rapp, Oak Creek, WI (US); Gary A. Gauger, Franklin, WI (US); Richard A. Harthun, Eagle, WI (US)

(73) Assignee: Cooper Industries, Inc., Houston, TX (US)

( * ) Notice: Subject to any disclaimer, the term of this patent is extended or adjusted under 35 U.S.C. 154(b) by 275 days.

This patent is subject to a terminal disclaimer.

(21) Appl. No.: 10/963,841

(22) Filed: Oct. 12, 2004

(65) Prior Publication Data

US 2005/0040375 A1 Feb. 24, 2005

Related U.S. Application Data

(60) Continuation of application No. 10/619,893, filed on Jul. 15, 2003, now Pat. No. 6,905,638, which is a continuation of application No. 10/116,259, filed on Apr. 4, 2002, now Pat. No. 6,613,250, which is a continuation of application No. 09/288,877, filed on Apr. 9, 1999, now Pat. No. 6,398,986, which is a continuation-in-part of application No. 09/276,191, filed on Mar. 25, 1999, now Pat. No. 6,184,459, which is a division of application No. 08/728,261, filed on Oct. 8, 1996, now Pat. No. 6,037,537, which is a division of application No. 08/576,372, filed on Dec. 21, 1995, now abandoned.

(51) Int. Cl.
  *C09K 5/00* (2006.01)

(52) U.S. Cl. .......................... 252/570; 252/579; 336/58; 336/94; 174/17 LF

(58) Field of Classification Search ................. 252/570, 252/579; 336/58, 94; 174/17 LF
See application file for complete search history.

(56) References Cited

U.S. PATENT DOCUMENTS 1,935,595 A 2/1933 Clark (Continued)

FOREIGN PATENT DOCUMENTS

CA 2204273 11/1998

(Continued)

OTHER PUBLICATIONS

Asadauskas et al., "Oxidative Stability and Antiwear Properties of High Oleic Vegetable Oils," *Journal of the Society of Tribologists and Lubrication Engineers*, Presanted at the 50th Annual Meeting in Chicago, May 14-19, 1995, 52(12):877-882.

(Continued)

*Primary Examiner*—Necholus Ogden, Jr.
(74) *Attorney, Agent, or Firm*—Shumaker & Sieffert, P.A.

(57) ABSTRACT

In one aspect, the present invention provides a dielectric fluid for use in electrical equipment comprising a vegetable oil or vegetable oil blend. In another aspect the invention provides devices for generating and distributing electrical energy that incorporate a dielectric fluid comprising a vegetable oil or vegetable oil blend. Methods of retrofilling electrical equipment with vegetable oil based dielectric fluids also are provided.

5 Claims, 1 Drawing Sheet

U.S. PATENT DOCUMENTS

| | | | |
|---|---|---|---|
| 2,288,341 | A | 6/1942 | Addink et al. |
| 2,440,930 | A | 5/1948 | Camilli et al. |
| 2,825,651 | A | 2/1958 | Loo et al. |
| 3,073,885 | A | 1/1963 | Camilli |
| 3,233,198 | A | 2/1966 | Schrader et al. |
| 3,626,080 | A | 12/1971 | Pierce |
| 3,702,895 | A | 11/1972 | De Sio |
| 3,740,685 | A | 6/1973 | Fisher |
| 3,772,624 | A | 11/1973 | Keogh |
| 3,902,146 | A | 8/1975 | Muralidharan |
| 4,019,996 | A | 4/1977 | Jay et al. |
| 4,053,941 | A | 10/1977 | Shimizu et al. |
| 4,082,866 | A | 4/1978 | Link |
| 4,085,395 | A | 4/1978 | Billerbeck et al. |
| 4,108,789 | A | 8/1978 | Jay et al. |
| 4,142,983 | A | 3/1979 | Jay et al. |
| 4,166,807 | A | 9/1979 | Komatsu et al. |
| 4,177,156 | A | 12/1979 | Jay et al. |
| 4,187,327 | A | 2/1980 | Lapp et al. |
| 4,211,665 | A | 7/1980 | Pellegrini |
| 4,219,791 | A | 8/1980 | Moore et al. |
| 4,238,343 | A | 12/1980 | Pellegrini |
| 4,256,591 | A | 3/1981 | Yamamoto et al. |
| 4,259,708 | A | 3/1981 | Mandelcom |
| 4,266,264 | A | 5/1981 | Mandelcom et al. |
| 4,276,184 | A | 6/1981 | Mandelcom et al. |
| 4,282,106 | A | 8/1981 | Schaap et al. |
| 4,290,926 | A | 9/1981 | Shaw |
| 4,294,715 | A | 10/1981 | Klein et al. |
| 4,320,034 | A | 3/1982 | Lapp et al. |
| 4,343,029 | A | 8/1982 | Renga et al. |
| 4,347,169 | A | 8/1982 | Sato et al. |
| 4,355,346 | A | 10/1982 | Gauger et al. |
| 4,384,972 | A | 5/1983 | Nakamura et al. |
| 4,388,669 | A | 6/1983 | Cichanowski |
| 4,413,674 | A | 11/1983 | Avery et al. |
| 4,425,949 | A * | 1/1984 | Rowe, Jr. ................ 141/1 |
| 4,427,561 | A | 1/1984 | Kusayanagi et al. |
| 4,429,345 | A * | 1/1984 | Vincent ................ 361/315 |
| 4,437,082 | A | 3/1984 | Walsh et al. |
| 4,467,305 | A | 8/1984 | Ando |
| 4,493,943 | A | 1/1985 | Sato et al. |
| 4,511,949 | A | 4/1985 | Shedigian |
| 4,530,782 | A | 7/1985 | Meyer |
| 4,536,331 | A | 8/1985 | Shedigian |
| 4,543,207 | A | 9/1985 | Sato et al. |
| 4,549,034 | A | 10/1985 | Sato et al. |
| 4,566,994 | A | 1/1986 | Hasegawa et al. |
| 4,570,043 | A | 2/1986 | Lloyd et al. |
| 4,618,914 | A | 10/1986 | Sato et al. |
| 4,621,302 | A | 11/1986 | Sato et al. |
| 4,621,980 | A | 11/1986 | Reavely et al. |
| 4,623,953 | A | 11/1986 | Dakin |
| 4,627,192 | A | 12/1986 | Fick |
| 4,681,302 | A | 7/1987 | Thompson |
| 4,681,980 | A | 7/1987 | Sato et al. |
| 4,697,043 | A | 9/1987 | Rowe, Jr. |
| 4,702,966 | A | 10/1987 | Farrell et al. |
| 4,734,824 | A | 3/1988 | Sato et al. |
| 4,738,780 | A | 4/1988 | Atwood |
| 4,744,000 | A | 5/1988 | Mason et al. |
| 4,744,905 | A | 5/1988 | Atwood |
| 4,745,966 | A | 5/1988 | Avery |
| 4,747,447 | A | 5/1988 | Scanian et al. |
| 4,806,276 | A | 2/1989 | Maier |
| 4,828,703 | A | 5/1989 | Atwood |
| 4,834,257 | A | 5/1989 | Book et al. |
| 4,846,163 | A | 7/1989 | Bannister et al. |
| 4,929,784 | A | 5/1990 | Klinkmann et al. |
| 4,990,718 | A | 2/1991 | Pelrine |
| 5,077,069 | A | 12/1991 | Chang et al. |
| 5,102,659 | A | 4/1992 | Hudson |
| 5,143,763 | A | 9/1992 | Yamada et al. |
| 5,159,527 | A | 10/1992 | Flynn |
| 5,171,918 | A | 12/1992 | Shubkin et al. |
| 5,180,518 | A | 1/1993 | Sugihara et al. |
| 5,223,346 | A | 6/1993 | Lu |
| 5,250,750 | A | 10/1993 | Shubkin et al. |
| 5,259,978 | A | 11/1993 | Yoshimura et al. |
| 5,260,077 | A | 11/1993 | Carrick et al. |
| 5,336,423 | A | 8/1994 | Pialet et al. |
| 5,429,761 | A | 7/1995 | Havelka et al. |
| 5,439,648 | A | 8/1995 | Balderson et al. |
| 5,451,334 | A | 9/1995 | Bongardt et al. |
| 5,538,654 | A | 7/1996 | Lawate et al. |
| 5,571,492 | A | 11/1996 | Yao et al. |
| 5,641,734 | A | 6/1997 | Naegely |
| 5,691,285 | A | 11/1997 | Coffey et al. |
| 5,736,915 | A | 4/1998 | Goedde et al. |
| 5,766,517 | A | 6/1998 | Goedde et al. |
| 5,767,047 | A | 6/1998 | Duncan et al. |
| 5,949,017 | A | 9/1999 | Oommen et al. |
| 5,958,851 | A | 9/1999 | Cannon et al. |
| 5,965,755 | A | 10/1999 | Sernyk et al. |
| 6,037,537 | A | 3/2000 | McShane et al. |
| 6,169,190 | B1 | 1/2001 | Lanuza et al. |
| 6,184,459 | B1 | 2/2001 | McShane et al. |
| 6,274,067 | B1 | 8/2001 | Oommen et al. |
| 6,312,623 | B1 | 11/2001 | Oommen et al. |
| 6,352,655 | B1 | 3/2002 | McShane et al. |
| 6,389,986 | B1 | 5/2002 | Twomey et al. |
| 2002/0027219 | A1 | 3/2002 | Oommen et al. |

FOREIGN PATENT DOCUMENTS

| | | |
|---|---|---|
| GB | 22559/29 | 2/1930 |
| JP | 52-25298 | 2/1977 |
| JP | 2-5793 | 7/1982 |
| JP | 62-40802 | 5/1984 |
| JP | 61-42816 | 3/1986 |
| JP | 61-156604 | 7/1986 |
| JP | 61-156605 | 7/1986 |
| JP | 61-260503 | 11/1986 |
| JP | 63-24501 | 2/1988 |
| JP | 88-024501 | 2/1988 |
| WO | WO 94/14731 | 7/1994 |
| WO | WO 97/49100 | 12/1997 |

OTHER PUBLICATIONS

Clark, "Insulating Materials for Design and Engineering Practice," 1962, pp. 131, 132, 210-213, 216-218, 342, 344, 345, and 383.

"Contoured Transformer Unveiled," Transmission & Distribution, p. 42.

*Cooper Industries, Inc.* v. *Asea Brown Boveri Inc.*, et al., Case No. 03-C-273 "Defendants' Answer, Affirmative Defenses and Counterclaim," Sep. 24, 2003.

*Cooper Industries, Inc.* v. *Asea Brown Boveri Inc.*, et al., Case No. 03-C-273, Cooper's Reply Brief on Claim Construction including Declaration of Jacob B. Angelo and Supplemental Declaration of Charles L. Liotta, Apr. 12, 2004.

*Cooper Industries, Inc.* v. *Asea Brown Boveri Inc.*, et al., Case No. 03-C-273, "ABB 's Brief on Claim Construction".

*Cooper Industries, Inc.* v. *Asea Brown Boveri Inc.*, et al., Case No. 03-C-273, "Defendants' Answer to First Amended Complaint, Affirmative Defenses and Counterclaim," Dec. 17, 2003.

Keshavamurthy et al., "Rape Seed Oil Derivative As A New Capacitor Impregnant," *Conerence Record of the 1994 IEEE International Symposium on Electrical Insulation*, Pittsburgh, PA, Jun. 5-8, pp. 418-421.

Marinho, Jr et al., Castor Oil As An Insulating Liquid, *cigré Symposium* May 1987, Vienna, pp. 1-5.

McShane, "New Safety Dielectric Coolants for Distribution and Power Transformers," *IEEE Industry Applications*, May/Jun. 2000, pp. 24-32.

Sundin, "Fluid Choices in Retrofitting PCT Transformers," *Conference Record of the 1992 IEEE International Symposium on Electrical Insulation*, Baltimore, MD, Jun. 7-10, 3 pages.

Sustane Food-Grade Antioxidants product brochure, 5 pages.

Weber and McShane, "Natural and Synthetic Ester Dielectric Fluids and Novel Insulation Systems for Their Use," *Edison Electric Institute Distribution Conference*, Milwaukee, WI, Oct. 6, 1988, 12 pages.

Notification of Transmittal of the International Search Report dated Apr. 7, 1997, International Application No. PCT/US96/20495.

Written Opinion dated Dec. 18, 1997, International Application No. PCT/US96/20495.

Notification of Transmittal of International Preliminary Examination Report dated Apr. 30, 1998, International Application No. PCT/US96/20495.

A. Dieter, "Developers seek patent for locally made soy-based oil," 1 page.

Wilson, A.C.M., "Insulating Liquids: Their Uses, Manufature and Properties," The Institution of Electrical Engineers, London, 1980, pp. 4-7, 129, and 171-172, Index pp. 209-221.

"FERC finds three IOUs guilty of open-access violations," Public Power Weekly, No. 98-22, Jun. 1, 1998, pp. 1, 5.

Letter from Paul R. Katterle to H. Sanders Gwin, Jr. dated Oct. 26, 2004 (2 pages) including attachments (7 pages).

"Medical Encyclopedia: Vitamin E," printed May 20, 2005 from http://www.nlm.nih.gov.medlineplus/print/ency/article/002406.htm, 2 pages.

"Soybean Composition," printed May 20, 2005 from http://www.unitedsoybean.org/soystats2002/composition.html, 1 page.

"Fluids—Kinematic Viscosities," printed May 20, 2005 from http://www.engineeringtoolbox.com/kinematic-viscosity-21_397.html, 10 pages.

*Cooper Industries, Inc.* v. *Asea Brown Boveri Inc.*, et al., Case No. 03-C-0723, "Decision and Order," Apr. 2, 2005, 30 pages.

*Cooper Industries, LLC* v. *Asea Brown Boveri Inc.*, et al., Civil Action No. 03-C-0723, "Defendants' Answer, Affirmative Defenses, and Counterclaim to Plaintiff's Second Amended Complaint," Jul. 11, 2005, 23 pages.

\* cited by examiner

VEGETABLE OIL BASED DIELECTRIC FLUID AND METHODS OF USING SAME

CROSS-REFERENCE TO RELATED APPLICATIONS

This application is a continuation of application Ser. No. 10/619,893, filed Jul. 15, 2003 now U.S. Pat. No. 6,905,638, which is a continuation of application Ser. No. 10/116,259, filed Apr. 4, 2002, now U.S. Pat. No. 6,613,250, which is a continuation of application Ser. No. 09/288,877, filed Apr. 9, 1999, now U.S. Pat. No. 6,398,986, which is a continuation-in-part of application Ser. No. 09/276,191, filed Mar. 25, 1999, now U.S. Pat. No. 6,184,459, which is a divisional of application Ser. No. 08/728,261, filed Oct. 8, 1996, now U.S. Pat. No. 6,037,537, which is a divisional of application Ser. No. 08/576,372, filed Dec. 21, 1995 (abandoned).

FIELD OF THE INVENTION

In one aspect, the present invention relates to dielectric fluid compositions, including insulating oils, for use in electrical distribution and power equipment, including transformers, switching gear, and electric cables. In another aspect the invention relates to vegetable oil-based insulating fluids and, more particularly, to the use of compositions comprising one or more vegetable oils. In yet another aspect, the present invention relates to the modification of electrical distribution equipment in a manner that enhances their suitability for vegetable oil-containing dielectric fluid compositions.

BACKGROUND OF THE INVENTION

Dielectric (or insulating) fluids used in electrical distribution and power equipment—including transformers, switching gear and electric cables—perform two important functions. These fluids act as an electrical insulating medium, i.e., exhibit dielectric strength, and they transport generated heat away from the equipment, i.e., act as a cooling medium. When used in a transformer, for example, dielectric fluids transport heat from the windings and core of the transformer or connected circuits to cooling surfaces. Apart from possessing dielectric strength and cooling capacity, an ideal dielectric fluid for electrical equipment also exhibits little or no detrimental impact on the environment, is compatible with materials used to construct the equipment, and is relatively nonflammable.

For more than a century, mineral oils derived from crude petroleum were used extensively as insulating and cooling liquids in electrical equipment. Though such oils possess a satisfactory dielectric strength and are compatible with equipment materials, they are not considered nonflammable, and, because they are petroleum-based, they are considered to carry with them an environmental cost. In the middle part of this century, as safety standards became more demanding for many indoor and vault equipment installations, mineral oils were replaced to a large extent by nonflammable liquids such as askarel (polychlorinated biphenyl, or PCB) fluids. Beginning in the 1930s, for example, PCBs—which generally are considered nonflammable—were used extensively to replace mineral oils in fire sensitive locations as insulating fluids in electrical equipment.

PCBs eventually were recognized for their environmental hazards, and as a result the production and sale of PCBs as well as their use in new equipment was banned. For existing PCB-filled equipment, stringent regulations now require removal of PCB fluids at certain installations and, for all other installations, place stringent restrictions on the use of PCB-filled equipment. Spill reporting, clean-up, and disposal of PCB-filled equipment also now require compliance with very strict EPA regulations.

Because of the disadvantages and shortcomings of PCB-based fluids and because of the increasing sensitivity to the potential adverse environmental impact of mineral oils and available alternatives, there have been and continue to be numerous efforts undertaken to develop relatively inexpensive, environmentally safe, and nonflammable dielectric fluids. To date, these efforts have not been completely successful.

There are a number of specific functional properties characteristic of dielectric oils. An oils dielectric breakdown, or dielectric strength, for example, provides an indication of its ability to resist electrical breakdown and is measured as the minimum voltage required to cause arcing between two electrodes at a specified gap submerged in the oil. The impulse dielectric breakdown voltage provides an indication of an oils ability to resist electrical breakdown under transient voltage stresses such as lightning and power surges. The dissipation factor of an oil is a measure of the dielectric losses in the oil; a low dissipation factor indicates low dielectric loss and a low concentration of soluble, polar contaminants. The gassing tendency of an oil measures the oils tendency to evolve or absorb gas under conditions where partial discharge is present.

Because one function of a dielectric fluid is to carry and dissipate heat, factors that significantly affect the relative ability of the fluid to function as a dielectric coolant include viscosity, specific heat, thermal conductivity, and the coefficient of expansion. The values of these properties, particularly in the range of operating temperatures for the equipment at full rating, must be weighed in the selection of suitable dielectric fluids for specific applications.

In addition to the foregoing properties that affect heat transfer, a dielectric fluid, to be useful in commercial applications, should have a relatively high dielectric strength, low dissipation factor, a dielectric constant that is compatible with the solid dielectric, a low gassing tendency, and it must be compatible with the electrical equipment materials to which it is exposed.

Current codes and standards require further that any dielectric fluid intended for use as a coolant not be classified as Flammable, but rather as a Class IIIB Combustible liquid. Specific safety requirements, however, vary with the application to which the electric equipment containing the fluid is used. Such applications include, for example, indoor and rooftop installations, vault applications, and installations adjacent to building structures. According to the degree of hazard attendant to these varied applications, one or more additional safeguards may be required. One recognized safeguard is the substitution of conventional mineral oils with less-flammable and/or nonflammable liquids. Less-flammable liquids are considered to be those having an open-cup fire point equal to or greater than 300° C.

Several dielectric fluids are known and used in electrical equipment. Due, however, to an increasing awareness and sensitivity toward environmental concerns, it has become increasingly desirable to provide a dielectric fluid that: (1) poses minimal environmental hazards; (2) degrades quickly and easily so that spills do not contaminate the soil or the water table for any significant period of time; and (3) does not interfere in any significant way with natural biodegradation processes. It also is becoming more desirable to replace non-renewable resources with renewable resources, particularly given the undesirability of dependence on petroleum-derived products, and there generally is increased demand by the industrial and retail markets for all-natural products. This is due, at least in part, from the attention paid to the long-term effects of materials and their degradation by-products.

In prior, related co-pending application Ser. No. 08/728,261, now U.S. Pat. No. 6,037,537—which is incorporated in its entirety by reference—we described a class of insulating dielectric fluids comprising vegetable oil materials. These compositions, useful in electrical distribution and power equipment, utilize low maintenance vegetable oil-based dielectric coolants that meet or exceed applicable safety and performance standards and that are free of substantial environmental hazards.

SUMMARY OF THE INVENTION

In one aspect, the present invention provides a dielectric fluid for use in electrical equipment. The dielectric fluid comprises a vegetable oil or vegetable oil blend. In another aspect the invention provides devices for transforming, generating, and/or distributing electrical energy, including electrical transmission cables, switching gear and transformers, that incorporate a dielectric fluid comprising a vegetable oil or vegetable oil blend. In yet another aspect, the invention provides methods of retrofilling electrical equipment with vegetable oil-based dielectric fluids.

DETAILED DESCRIPTION OF PREFERRED EMBODIMENTS

Figure 2:
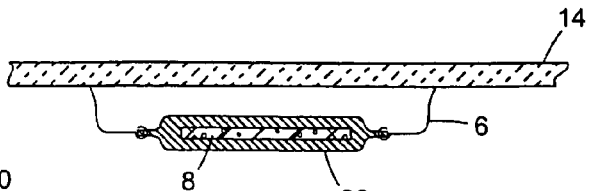
FIG. 2 shows oxygen absorption material housed in an oxygen permeable encasement fastened to the tank cover of an electrical transformer.

As their most essential component, the dielectric fluids of the present invention comprise one or more vegetable oil compositions, many of which are derived from plant matter. Vegetable oils typically comprise mixed glycerides formed from a polyol backbone, such as glycerin, in which the constituent hydroxyl groups are esterified with an equal or nearly equal number of fatty acid molecules. Many useful vegetable oils are triglycerides, i.e., are glycerides having three fatty acid molecules chemically bonded to the glycerin backbone. Such triglycerides generally are of the formula:

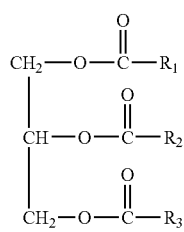

wherein $R_1$, $R_2$ and $R_3$ each, independently, is an alkyl or alkenyl group that may be straight-chained or branched, may be saturated or unsaturated, and may be unsubstituted or may be substituted with one or more functional or non-functional moieties.

Differences in the functional properties of vegetable oils generally are attributable to the variation in their constituent fatty acid molecules. Several different fatty acids exist, including the following, all of which may be present in the vegetable oils of the invention: myristic, palmitic, stearic, oleic, linoleic, linolenic, arachidic, eicosenoic, behenic, erucic, palnitiolic, docosadienoic, lignoseric, tetracossenoic, margaric, margaroleic, gadoleic, caprylic, capric, lauric, pentadecanoic, and heptadecanoic acids. These fatty acid molecules can also vary in their degree of unsaturation.

Fatty acid molecules may be arranged on a polyol backbone in any number of ways, and each polyol can have one, two or several different constituent fatty acid molecules. The three fatty acid molecules on a triglyceride molecule, for example, may be the same or may comprise two or three different fatty acid molecules. While the compositions of triglyceride compounds found in plant matter vary from species to species, and less so from strain to strain of a particular species, vegetable oil derived from a single strain of plant species generally will have the same fatty acid composition.

Every naturally occurring triglyceride has a unique set of properties. For example, some triglycerides are more susceptible to oxidation than are others. According to the present invention, it is preferred to use oils having fatty acid molecules that include a component having at least one degree of unsaturation (i.e., at least one C=C double bond). This selection strikes a balance between the effects of oxidation with a desired reduction in the evolution of hydrogen gas. It has been found that oils containing mono-unsaturates oxidize less rapidly than do polyunsaturated oils and are therefore somewhat preferred for use in the present invention. Specific, representative, vegetable oils suitable for use in the present invention include the following: castor, coconut, corn, cottonseed, crambie, jojoba, lesquerella, linseed, olive, palm, rapeseed (canola), safflower, sunflower, soya, and veronia.

Useful vegetable oils preferably have an open-cup fire point well above the accepted minimum standard of 300° C. for both conventional dielectric fluids and for less-flammable liquids. Several oils, for example, typically have fire points of approximately 350° C. According to the present invention, preferred oils have viscosities between about 2 and about 15 cSt at 100° C. and less than about 110 cSt at 40° C. and have heat capacities (specific heats) of greater than about 0.3 cal/g-° C. The vegetable oils of the invention also preferably have a dielectric strength of greater than about 30 kV/100 mil gap, more preferably greater than 35 kV/100 mil gap, and have a dissipation factor of less than about 0.05% at 25° C., more preferably less than about 0.03% at 25° C.

The vegetable oils of the invention may be used alone or may be blended together with one or more other vegetable oils. In appropriate circumstances, a vegetable oil or vegetable oil blend may also be combined with a minor amount of one or more synthetic oils, including mineral oils. When a vegetable oil or vegetable oil blend is combined with one or more synthetic oils, the amount and/or character of the non-vegetable oil component of the resulting blend should not interfere with the beneficial properties of the vegetable oil fluid. Thus, for example, any significant amount of a chlorinated fluid (aromatic chlorinated compounds such as trichlorobenzene or polychlorinated biphenyls) will negate many of the positive environmental attributes of the vegetable oil component. Where such blends are employed, the blend should contain less than 50 percent by weight of a petroleum-derived mineral oil, preferably less than 30 percent by weight, more preferably less than 20 percent by weight, and should contain less than 20 percent by weight of a chlorinated fluid, preferably less than 5 weight percent, and more preferably less than 1 percent by weight. It is also preferred that the vegetable oil blend be food grade, i.e., that it not contain any component that is considered toxic or otherwise biologically hazardous.

The vegetable oil and oil blends, where desired, may be pigmented or colored with a suitable dye or pigment. Any known dye or pigment can be used for this purpose, and many are available commercially as food additives. The most useful dyes and pigments are those that are oil soluble.

Because of its negative effect on dielectric performance, the presence of water, a polar contaminant, in the vegetable oil-based fluid is undesirable. Water in the fluid tends to increase the rate of chemical breakdown of fatty acid esters in the vegetable oil in proportion to the amount of water available for such a reaction. The most obvious indicator of such reactions is a significant increase in the value of the neutralization number as measured by ASTM D974.

This problem can be compounded by the wide temperature range over which electrical distribution equipment must operate. It is known that the dielectric breakdown characteristics and other dielectric properties of mineral oils are directly related to the percent saturation of water present in the oil. The water saturation point of an oil is in turn a function of temperature. As the saturation point is reached, dielectric strength falls rapidly. The water saturation point for mineral oils typically used as dielectric coolants is approximately 65 ppm at room temperature but over 500 ppm at normal operating temperatures (approx. 100° C.). Electrical distribution equipment exposed to a wide variation in temperature can suffer a fluctuation in the degree of water saturation in the dielectric fluid, and water that is dissolved or in vapor/liquid equilibrium at high operating temperatures can precipitate or condense when the temperature of the oil decreases.

Currently accepted standards typically require the removal of moisture from conventional mineral oils to below about 35 ppm for use in new distribution equipment. The moisture removal process uses either evaporation in a reduced pressure chamber or filtration, or a combination of both, to reach a level of between about 15 and 25 percent saturation at room temperature (10-15 ppm) prior to filling of the distribution equipment.

In contrast to mineral oils, vegetable oils generally have much higher moisture saturation points; typically over 500 ppm at room temperature. Therefore, acceptable moisture levels in vegetable oils used in new distribution equipment can be much higher than those for conventional mineral oils. Because the presence of water in vegetable oils can cause the additional breakdown of the constituent fatty acid esters, however, the moisture removal process used in the preparation of vegetable oil-based dielectric fluids should strive for moisture levels that reach below, as a percentage of saturation, those typically required for mineral oils. A moisture level between about 5 and about 10 percent of the saturation level of water in the vegetable oil at room temperature is preferred. The oils also are preferably processed by filtration or other suitable means to remove particulate and other contaminants. This can be accomplished in a manner similar to the techniques for treating and processing convention mineral oil-based dielectric materials.

Most useful vegetable oils are susceptible to polymerization upon exposure to free oxygen. Free oxygen activates unsaturated bonds in such vegetable oils to begin an oxidative polymerization process. Such polymerization manifests itself in a marked increase in viscosity and a corresponding decrease in dielectric properties of the affected oil. The rate of this polymerization is, in part, a function of the temperature of the oil at the time of exposure to free oxygen, and the by-products produced as a result of such polymerization are undesirable because they have chemical properties that are inferior to the virgin, or unpolymerized, oils. This degradation of vegetable oil by oxidative polymerization is due to long-term exposure to free oxygen, and it therefore can escape immediate detection.

The dielectric fluids of the invention optionally further comprise an oxidation reducing composition. Such compositions comprise one or more compounds that absorb, or scavenge, oxygen that otherwise would dissolve in the vegetable oil composition and result in oxidative breakdown of the oil. When used, the oxygen absorbing compound is preferably encased in a housing composed primarily of a polymeric material that is substantially permeable to oxygen and substantially impermeable to water and water vapor and that exhibits a high degree of mechanical strength throughout the operating temperatures of the electrical equipment in which they are employed.

Useful oxidation reducing compounds are those that are capable of reducing the concentration of free oxygen in the atmosphere surrounding the dielectric fluid inside the sealed housing of electrical distribution equipment and that in turn reduce the presence of dissolved oxygen in the fluid itself. Such compounds can be referred to as oxygen scavenging compounds. Useful oxygen scavenging compounds include those commonly employed in the food packaging industry. Representative of the oxygen scavenging compounds useful in the practice of the invention include the following: sodium sulfite; copper sulfate pentahydrate; a combination of carbon and activated iron powder; mixtures of hydrosulfite, calcium hydroxide, sodium bicarbonate and activated carbon; a metal halide powder coated on the surface of a metal powder; and combinations of alkali compounds, such as calcium hydroxide, with sodium carbonate or sodium bicarbonate. Mixtures and combinations of one or more of the above compositions are also considered useful.

Also useful as oxygen scavenging compounds are those compositions provided according to of U.S. Pat. No. 2,825,651, which is incorporated by reference, including an oxygen remover composition comprising an intermixing of a sulfite salt and an accelerator such as hydrated copper sulfate, stannous chloride, or cobaltous oxide. Another useful class of oxygen scavenging compounds are those compositions comprising a salt of manganese, iron, cobalt or nickel, an alkali compound, and a sulfite or deliquescent compound, such as disclosed by U.S. Pat. No. 4,384,972, which also is incorporated by reference.

Preferred oxygen scavenging compounds include (or include as their base component) at least one basic iron oxide, such as a ferrous iron oxide, or are made of mixtures of iron oxide materials. Useful iron oxide-containing compositions are available commercially, for example, under the Ageless trade name from the Mitsubishi Gas Chemical Company of Duncan, S.C. and under the Freshmax trade name from Multisorb Technologies, Inc. of Buffalo, N.Y. Also useful are oxygen absorbing agents comprising a mixture of ferrous salts and an oxidation modifier and/or a metallic sulfite or sulfate compound. Such compounds react with oxygen according to the following reaction mechanism:

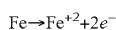

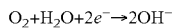

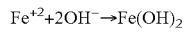

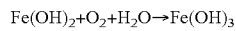

It should be noted that, in the reaction scheme outlined above, water is also consumed, an advantageous benefit in the present application, because, as outlined previously, water is a polar contaminant that can itself adversely affect the dielectric properties of the vegetable oils when present in significant quantities.

The oxygen scavenging material is encased in a housing composed essentially of a polymeric material that exhibits a high permeability to oxygen and that also preferably exhibits a low permeability to water and water vapor and that exhibits significant mechanical strength throughout the temperature range typically encountered in electrical distribution equipment. Specifically, useful polymeric materials are those that have an oxygen permeability of at least about 2,000 cc-mil/100 in$^2$/24 hrs/atm, preferably at least about 3,000 cc-mil/100 in$^2$/24 hrs/atm, and more preferably at least about 4,000 cc-mil/100 in2/24 hrs/atm. Permeability values for some representative polymers are provided, for example, in G. Gruenwald, Plastics: How Structure Determines Properties, p. 242 (Hanser, 1992). Useful polymeric materials also preferably have a tensile strength measured according to ASTM method D 882 of at least about 3500 psi, more preferably at least about 4,000 psi, and have a melting temperature higher than about 160° C.

Examples of suitable polymeric materials include polyolefins such as high density polyethylene, polypropylene, polybutylene, and copolymers thereof; polyphenylene oxide; polyethersulfone; nonwoven materials, including polyester felt; and cellulose pressboards. A particularly preferred polymer material is polymethylpentene.

The encasement housing for the oxidation reducing composition may be made from the polymeric material in any manner that permits the oxidation reducing composition to be in communication with the dielectric fluid headspace and allow for the direct exposure of any oxygen in the environment with the oxidation reducing composition. The housing may be a simple pouch construction in which the oxidation reducing composition is encased within a film made of the polymeric material that is sealed to itself by ultrasonic welding, thermal sealing or other suitable sealing method, or the housing may be constructed of metal, hard plastic, or other suitable material and have a window of film made of the oxygen permeable polymeric material through which the oxidation reducing composition communicates with the dielectric fluid headspace.

The encasement housing may be placed inside the electrical distribution equipment in any configuration that allows for communication (through the polymeric material) between the oxidation reducing composition and the dielectric fluid headspace. The housing thus may form an integral portion of the tank portion of the electrical equipment that holds the dielectric fluid. The housing may also be placed immediately inside and attached to the dielectric fluid tank portion of the electrical equipment and held there within the headspace of the tank.

The long term stability of the dielectric fluids of the invention may be improved by utilizing any of the conventional methods known for improving the stability or performance of dielectric fluids. For example, one or more antioxidant or antimicrobial compounds may be added to the dielectric fluid. Useful antioxidant compounds for this purpose can be dissolved directly in the dielectric fluid comprising the vegetable oil and include, for example, BHA (butylated hydroanisole), BHT (butylated hydrotoluene), TBHQ (tertiary butylhydroquinone), THBP (tetrahydrobutrophenone), ascorbyl palmitate (rosemary oil), propyl gallate, and alpha-, beta- or delta-tocopherol (vitamin E). It is generally also desirable to include in the dielectric fluid one or more additives to inhibit the growth of microorganisms. Any antimicrobial substance that is compatible with the dielectric fluid may be blended into the fluid. In some cases, compounds that are useful as antioxidants also may be used as antimicrobials. It is known, for example, that phenolic antioxidants such as BHA also exhibit some activity against bacteria, molds, viruses and protozoa, particularly when used with other antimicrobial substances such as potassium sorbate, sorbic acid or monoglycerides. Vitamin E, ascorbyl palmitate and other known compounds also are suitable for use as antimicrobial additives to the dielectric fluid.

The performance of dielectric fluids at low temperatures is important in some applications. Some vegetable oils do not, by themselves, have pour point values sufficiently low to be suitable for standard electrical power distribution applications. Vegetable oils, unlike some conventional mineral oils, may also solidify or gel when cooled to a temperature just slightly above their pour point temperature for an extended period of time. A typical electrical power distribution application requires that a coolant have a pour point below about −20° C. The dielectric fluids of the invention, where insufficient themselves, can be modified to ensure flowability at moderately low temperatures typically encountered during off-cycles (lower than about −20° C.). Suitable modification of the dielectric fluids include the addition of a pour point depressant. Suitable pour point depressants include polyvinyl acetate oligomers and polymers and/or acrylic oligomers and polymers.

Low temperature characteristics may also be improved by judicious blending of oils. Certain oil blends, for example, have lower pour points than their individual constituent oils. For example, a blend of 25 percent by weight soya oil (I) with 75 percent by weight rapeseed oil (II) has a pour point of −24° C., compared with −15° C. and −16° C. for the constituent (I) and (II) oils respectively. Other vegetable oil blends that exhibit similarly advantageous reductions in pour points include: 25% soybean oil +75% oleate modified oil; 50% soybean oil +50% oleate modified oil; and 25% soybean oil +75% sunflower oil. It will be understood that this list of oil blends is not exhaustive and is offered merely to illustrate the nature of the invention.

The dielectric fluids of the invention preferably are introduced into the electrical equipment in a manner that minimizes the exposure of the fluid to atmospheric oxygen, moisture, and other contaminants that could adversely affect their performance. A preferred process includes drying of the tank contents, evacuation and substitution of air with dry nitrogen gas, filling under partial vacuum, and immediate sealing of the tank. If the electrical device requires a headspace between the dielectric fluid and tank cover, after filling and sealing of the tank, the gas in the headspace should be evacuated and substituted with an inert gas, such as dry nitrogen, under a stable pressure of between about 2 and about 3 psig at 25° C.

It is preferable in any case to minimize or eliminate the presence of oxygen in the headspace of the electrical equipment that contains a vegetable oil-based dielectric fluid. There are several different approaches to the design of electrical equipment. One design that generally is not suitable for the use of vegetable oil-based dielectric fluids is the conservator non-sealed type. A more common design type in ANSI/IEEE standard electrical distribution and medium power equipment employs the use of a tank headspace to allow for the expansion and contraction of the tank contents. Even if the headspace of the equipment is purged of air and replaced with inert gases, it is possible over the operating life for oxygen (air) to leak into the headspace from the openings of the cover or accessories, the slow migration of air through gaskets, and the operation of pressure relief devices. Ingress of oxygen into the headspace will eventually contribute to the consumption of any antioxidant additives in the fluid. It is also desirable therefore to minimize the presence of oxygen throughout the lifetime of the electrical equipment through careful design and manufacture. One such method for reducing the ingress of oxygen into the dielectric tank is to weld any components, covers, or access points that communicate with the tank headspace, as gaskets and other means for sealing such openings are all susceptible to leakage over time.

The dielectric fluids of the invention may be used in any application into which conventional dielectric fluids are employed. Thus, the vegetable oil based fluids of the invention may be incorporated into all types of electrical equipment, including, but not limited to, reactors, switchgear, regulators, tap changer compartments, high voltage bushings, and oil-filled cables.

Cables that are used for the transmission and distribution of electricity generally incorporate a dielectric fluid, and are often referred to simply as oil-filled cables. Oil-filled cables typically comprise at least one conductor around which there is provided a solid, stratified insulation formed by windings of insulation material tapes that are impregnated with an insulating oil. These cables also generally have at least one longitudinal duct or canal that allows for the movement of the insulating oil along the length of the cable. Oil-filled cables are used both for underwater and land-based applications, and particularly where submerged underwater, filled cables can be extremely sensitive to gasing tendency. Because they are most often pressurized, leakage from oil-filled cables can have a greater environmental impact from release of insulating fluid. The dielectric fluids of the present invention can be used to fill electrical cables. They can also be used to retrofill cables that initially contain a non-vegetable oil dielectric fluid.

Electrical transformers and switchgear typically are constructed by immersing the core and windings and other electrical equipment in a dielectric fluid and enclosing the immersed components in a sealed housing or tank. The windings in larger equipment frequently are also wrapped with a cellulose or paper material. The dielectric fluid of the invention can be used to fill new electrical equipment in the manner described above. The fluids can also be used to retrofill existing electrical equipment that incorporate other, less desirable dielectric fluids. Retrofilling existing equipment can be accomplished using any suitable method known in the art, though because of the increased sensitivity of vegetable oil fluids to moisture, it is important first to dry components of the electrical equipment prior to the introduction of the vegetable oil based dielectric fluid. This is important especially with respect to the cellulose or paper wrapping, which can absorb moisture over time. Because of the relatively high solubility of water in vegetable oils, a vegetable oil fluid can itself be used to dry out existing electrical equipment.

One method of retrofilling mineral oil containing transformers is discussed generally by Sundin in *Retrofilling Mineral Oil Transformers With Fire Resistant Fluids*, Electricity Today, pp. 14-15 (May 1996), which is incorporated by reference. A useful method for retrofilling oil-filled electrical transmission cables is described in U.S. Pat. No. 4,580,002, which is incorporated by reference. Other suitable methods will be known by those skilled in the art.

The following descriptions and Figures are offered to provide an illustration of the invention and are given in reference to an electrical transformer. It will be understood by those skilled in the art, however, that the compositions and methods encompassed by the present invention are equally suited for use in all types of electrical equipment, including those described above. These descriptions are to be understood as preferred and/or illustrative embodiments of the present invention and are not intended to limit the scope thereof.

Figure 1:
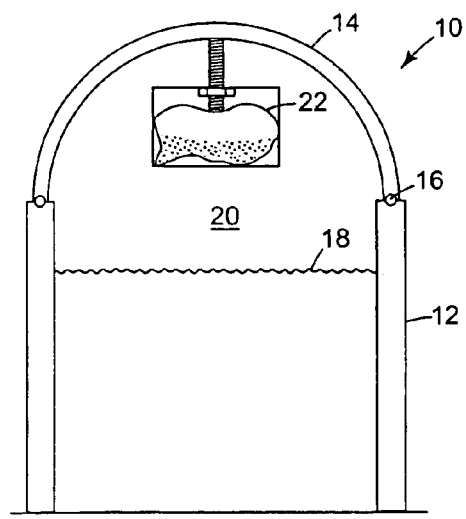
FIG. 1 provides a cross-sectional view of a transformer tank housing incorporating a vegetable oil-based dielectric fluid and oxygen absorption material housed in an oxygen permeable encasement.

Referring now to FIG. 1, a transformer tank 10 typically comprises a tank body 12, a tank cover 14 bolted or welded to tank body 12 and sealed with gasket 16. Tank body 12 is sealed. Tank 10 houses the transformer core and windings (not shown) or other electrical equipment, immersed in a dielectric fluid 18. The space between the surface of the fluid and the tank cover is the tank headspace 20. According to one embodiment of the present invention, a polymer container 22 containing an oxidation reducing composition is mounted in the headspace of the tank, preferably on the inside of the tank cover as shown in FIG. 1. As set forth above, container 22 is a pouch or bag encasement constructed of a oxygen permeable film.

A simple embodiment of the oxidation reducing composition is shown in FIG. 2 where a pre-packaged oxygen scavenging compound 8, such as is available commercially under the Ageless and Freshmax trade names, is encased in a pouch 22 constructed of a oxygen permeable polymer film, a polyester felt or a cellulose pressboard. The pouch is attached to the tank cover 14 by means of a simple clasp 6 or other suitable fastening means. This embodiment finds particular utility in relatively small electrical equipment, such as in pole-mounted transformer assemblies.

Figure 3:
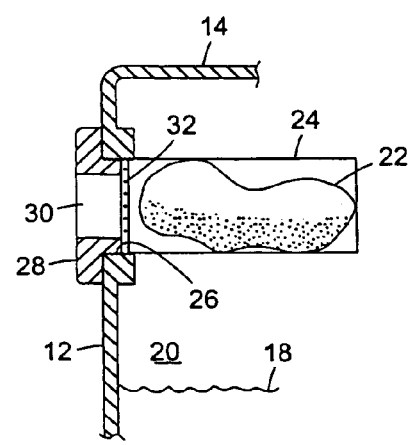
FIGS. 3-4 provide cross-sectional views of a transformer tank incorporating a vegetable oil-based dielectric fluid and an oxygen absorption material housed in an oxygen permeable encasement.

According to another preferred embodiment shown in FIG. 3, the container 22 is supported in a polyolefin housing 24 mounted adjacent to a threaded opening 26 in the tank cover. A threaded plug 28 seals the container in the opening in the tank cover 14 and preferably includes a transparent view port 30. It will be understood that view port 30 can alternatively be incorporated into another part of the tank cover or tank wall.

When it is desired or necessary to replace the container containing the oxidation reducing composition, the threaded plug 28 can be removed, and the container 22 removed from the polyolefin housing and replaced. The low gas permeability of housing 24 prevents significant gas exchange between the headspace 20 and the outside atmosphere during the short period of time that the threaded plug is removed. This can be accomplished even though the gas permeability of the container is not so high as to impede the operation of the oxidation reducing composition over more extended periods of time.

Still in reference to FIG. 3, in addition to the oxidation reducing composition, it is preferred to provide a means for indicating the presence of oxygen in the tank headspace. This indicator preferably is an oxygen sensitive compound 32 such as that marketed by Mitsubishi Gas Chemical Company under the trade name Ageless Eye. This compound exhibits a pink-to-blue color change when the ambient oxygen concentration exceeds 0.1%.

The oxygen indicator preferably is housed in the tank headspace wall in such a manner that it can both chemically contact the gas in the headspace and be visible for inspection from the outside of the tank. One way to accomplish this is to mount the oxygen indicator adjacent to the view port 30 as shown.

In addition to the foregoing, the use of a vegetable oil-based dielectric fluid in transformers can be facilitated through several modifications to the transformer tank. These include providing a sealed, accessible chamber such as described above in which the oxidation reducing composition can be replaced without increasing the exposure of the fluid in the tank to outside air. Other modifications reduce the leakage of the gas from within the tank, to thereby reduce the long-term exposure of the fluid to air.

Figure 4:
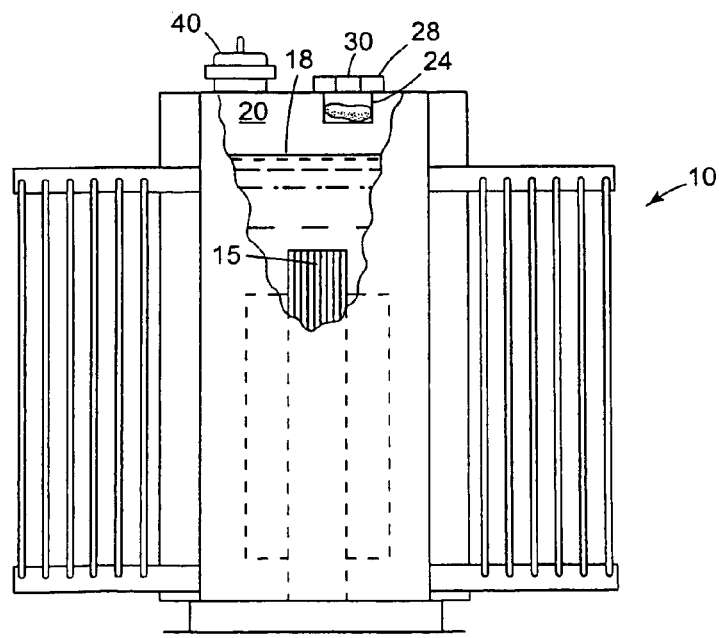

Referring to FIG. 4, one such modification relates to the volume of the tank headspace 20. Current ANSI/IEEE C57 series standards, for example, require distribution transformer tanks to remain sealed over a top oil temperature range of from −5° C. to 105° C. for pole-mounted and pad-mounted designs and over a 100° C. top oil range for substation transformers. Outside this range the tank is typically vented to avoid damage to the tank or related equipment. According to the present invention, the headspace volume is increased so that the temperature range over which the tank remains sealed increases correspondingly, thus reducing the probability of oxygen (air) leaking into the tank. Specifically, the present tank preferably includes a headspace volume sufficient to allow the tank to remain sealed from −20° C. to 115° C.

In addition, each tank includes an automatic pressure release device (PRD) 40 for venting the tank as described above. The PRD 40 can be calibrated to automatically vent headspace gas when the internal pressure exceeds acceptable levels, typically 9±1 psig, and to automatically reseal when the pressure reduces to a desired level, typically to 6±1 psig. Because the PRD reseals at a positive pressure, the headspace will maintain a positive pressure even after venting by the PRD. Maintaining a positive pressure in the headspace helps to prevent the ingress of air into the tank.

It is also preferable to replace conventional gaskets (not shown) with gaskets made from a material that is substantially gas impermeable. It will be understood that such gasket material must also be resistant to degradation by the dielectric fluid. Examples of suitable gasket material include nitrile rubber with a high acrylonitrile content, and various fluoroelastomers, of which the compound sold under the trade name VITON from the E.I. du Pont Nemours & Company, is representative. Other suitable fluoroelastomers are available commercially from Dyneon LLC of Oakdale, Minn. Materials with a relatively high gas permeability, such as silicone rubber and nitrile rubber having a low acrylonitrile content, are less suitable for gasket material. It will be understood that this list is illustrative only, and that other resilient, gas impermeable materials could be used to form the gaskets for the transformer tank. As mentioned above, another way to avoid the leakage associated with the long-term use of gaskets is to weld the equipment housing shut and thereby eliminate completely gasketed seals.

Another method for reducing gas ingress is to reduce or eliminate altogether the headspace and provide for thermal expansion by other means. The pressure/partial vacuum withstand would be based on a thermal range of the average fluid temperature of about −20° C. through about 115° C.

For units with sufficient headspace, vegetable oil-based dielectric fluids could also serve as excellent material in the recent development of High Temperature Transformers, which typically have a maximum top oil rated temperature rise over ambient of 115° C.

In addition to the foregoing, vegetable oil-based dielectric fluids in electrical equipment in which paper insulation has been substituted by non-cellulose insulating paper would have greater inherent stability. This is largely because cellulose materials liberate water as they degrade thermally. Candidate materials include aramid insulating materials, polyester materials, and polyamides.

While preferred embodiments of the invention have been shown and described hereinabove, modifications thereof can be made by one skilled in the art without departing from the spirit and scope of the invention.

What is claimed is:

1. A transformer comprising a housing, a core/coil assembly in the housing, and a dielectric fluid at least partially surrounding the core/coil assembly, wherein the dielectric fluid consists of one or more vegetable oils and one or more antioxidant compounds, and wherein the one or more vegetable oils have a viscosity of between 2 and 15 cSt at 100° C. and less than 110 cSt at 40° C.

2. The transformer of claim 1, wherein the one or more antioxidant compounds are selected from the group consisting of butylated hydroxyanisole (BHA), butylated hydroxytoluene (BHT), tertiary butylhydroxyquinone (TBHQ), tetrahydroxybutrophenone (THBP), ascorbyl palmitate, propyl gallate and alpha-, beta- or delta- tocopherol.

3. The transformer of claim 1, wherein at least one of the vegetable oils is oleate modified.

4. A transformer comprising a housing, a core/coil assembly in the housing, and a dielectric fluid at least partially surrounding the core/coil assembly, wherein the dielectric fluid consists of:
   one or more vegetable oils with a viscosity of between 2 and 15 cSt at 100° C. and less than 110 cSt at 40° C.;
   at least one antioxidant compound selected from the group consisting of butylated hydroxyanisole (BHA), butylated hydroxytoluene (BHT), tertiary butylhydroxyquinone (TBHQ), tetrahydroxybutrophenone (THBP), ascorbyl palmitate, propyl gallate and alpha-, beta- or delta- tocopherol; and
   at least one of a low temperature additive and an antimicrobial additive.

5. A method of using a transformer, comprising employing in the transformer a dielectric fluid, the dielectric fluid consisting of one or more vegetable oils and one or more antioxidant compounds, and wherein the one or more vegetable oils have a viscosity of between 2 and 15 cSt at 100° C. and less than 110 cSt at 40° C.

* * * * *

UNITED STATES PATENT AND TRADEMARK OFFICE
CERTIFICATE OF CORRECTION

PATENT NO. : 7,651,641 B2  Page 1 of 1
APPLICATION NO. : 10/963841
DATED : January 26, 2010
INVENTOR(S) : Corkran et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this

Twenty-eighth Day of December, 2010

David J. Kappos
*Director of the United States Patent and Trademark Office*